(12) United States Patent  
Ogasawara et al.

(10) Patent No.: US 7,116,612 B2  
(45) Date of Patent: Oct. 3, 2006

(54) OPTICAL PICKUP DEVICE DRIVEN BY AN ERROR SIGNAL OBTAINED FROM AN OPTICAL DETECTOR'S OUTPUT SIGNALS

(75) Inventors: Masakazu Ogasawara, Tsurugashima (JP); Yoshitsugu Araki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 529 days.

(21) Appl. No.: 10/043,287

(22) Filed: Jan. 14, 2002

(65) Prior Publication Data

US 2002/0101802 A1 Aug. 1, 2002

(30) Foreign Application Priority Data

Jan. 23, 2001 (JP) .............................. 2001-014428

(51) Int. Cl.  
*G11B 7/095* (2006.01)

(52) U.S. Cl. ................. 369/44.37; 369/44.26; 369/44.41

(58) Field of Classification Search ............. 369/44.41, 369/44.26, 44.37, 44.11, 44.29, 53.22, 47.17, 369/53.33  
See application file for complete search history.

(56) References Cited

U.S. PATENT DOCUMENTS

| | | | | |
|---|---|---|---|---|
| 5,123,003 A | * | 6/1992 | Noda et al. ............. | 369/44.37 |
| 5,404,344 A | * | 4/1995 | Imada et al. ............ | 369/44.14 |
| 5,479,387 A | * | 12/1995 | Ando et al. ............. | 369/44.23 |
| 5,892,741 A | * | 4/1999 | Kadowaki et al. ....... | 369/44.29 |
| 5,892,744 A | * | 4/1999 | Ohba ...................... | 369/44.37 |
| 5,959,953 A | * | 9/1999 | Alon ....................... | 369/44.41 |
| 6,545,959 B1 | * | 4/2003 | Iida ........................ | 369/47.17 |
| 2004/0066715 A1 | * | 4/2004 | Buchler .................. | 369/44.29 |

FOREIGN PATENT DOCUMENTS

| | | | |
|---|---|---|---|
| JP | 02172047 A | * | 7/1990 |
| JP | 10106018 A | * | 4/1998 |

OTHER PUBLICATIONS

Machine Translation of Nagano (JP 10-106018).*

* cited by examiner

*Primary Examiner*—Brian E. Miller  
*Assistant Examiner*—Peter Vincent Agustin  
(74) *Attorney, Agent, or Firm*—Drinker Biddle & Reath LLP

(57) ABSTRACT

A light beam from a light source is introduced to a grating element of a pickup device to create zero order diffracted light, ±first order diffracted light, and ±second order diffracted light. An irradiation system focuses the zero order, ±first order and ±second order diffracted light onto tracks extending on a recording surface of an optical recording medium to form spots. A spot of the zero order diffracted light is formed on a target track, spots of the ±second order diffracted light are formed on tracks adjacent to the target track, and spots of the ±first order diffracted light are formed midway between the spots of the ±zero order and ±second order diffracted light. An optical system guides returning light reflected from the spots to an optical detector. The optical detector has independent light-receiving elements for receiving the returning light. A servo signal calculator creates an error signal based on the output signals from the optical detector. The pickup device can be used for various types of optical discs having different disc structures. The pickup device can obtain a tracking error signal by a differential push-pull (DPP) method whatever optical disc is recorded and played back. The optical pickup device can use a crosstalk cancel (CTC) method whatever optical disc is played back.

20 Claims, 12 Drawing Sheets

OPTICAL PICKUP DEVICE DRIVEN BY AN ERROR SIGNAL OBTAINED FROM AN OPTICAL DETECTOR'S OUTPUT SIGNALS

BACKGROUND OF THE INVENTION

1. Field of the Invention

The present invention relates to an optical pickup for use in a record/playback device for radiating a light beam to an optical storage medium such as an optical disc to record or play back information.

2. Description of the Related Art

In recent times, high-recording density, large-capacity information-recording media known as DVDs (digital versatile discs) and record/playback systems using such DVDs have become widely known. DVDs are available as DVD-ROMs, DVD-RAMs, DVD-RWs, DVD-Rs, and so on. Although belonging to the same family, DVD-ROMs, DVD-RAMs, DVD-RWs and DVD-Rs are considerably different in optical disc structure. For example, as shown in FIG. 1 of the accompanying drawings, the ROM optical disc structure of the DVD-ROM has a train of embossed pits, which forms a series of concave and convex on the recording surface as recorded information on the recording surface. A series of concave and convex defines a track. The pits are sometimes referred to as information pits. As shown in FIG. 2 of the accompanying drawings, on the other hand, DVD-RW and DVD-R have a groove recordation type optical disc structure in which grooves are formed in the recording surface, which is made from a dye or a phase-change material, and a train of pits possessing different reflectance is formed on the top of the grooves as recorded information. Still another optical disc structure is known, which is called a land-groove recordation type optical disc structure as shown in FIG. 3 of the accompanying drawings. In the land-groove type structure, lands and grooves are formed from the dye or phase-change material, and trains of pits are formed on the lands and grooves. Accordingly, the record/playback systems for the DVD family is required to have compatibility with the different types of optical disc structure.

A three-beam pickup utilizing a three-beam method has been known as a device for tracking the light beam. Three beams are used in the three-beam method to detect the tracking. Specifically, a main beam is radiated onto the recording track to detect information pits on the recording track, and auxiliary beams are radiated on opposite sides of the main beam. For example, three beams (main and auxiliary beams) are emitted to a disc, three optical detectors are provided for the three optical spots of the three returning light beams respectively, and their radial push-pull signals are detected to obtain a differential signal between the radial push-pull signals. This is a differential push-pull method (referred to as "DPP method") demonstrated with the three-beam pickup, which can realize the tracking error detection substantially independent of the offset. In general, the three light beams are prepared with a diffraction grating. By diffracting a single light beam by the diffraction grating, the zero order diffracted light is taken as the generated main beam and ±first order diffracted light are taken as the auxiliary beams. The three-beam pick can also be used to suppress crosstalk between adjacent tracks. Referring to FIG. 4 of the accompanying drawings, the main beam or the zero order diffracted light is focused onto the target track, and the auxiliary beams or the ±first order diffracted light are focused on the adjacent tracks. Signals are simultaneously read from the adjacent tracks, and these signals are subtracted from a signal originating from the central main beam to cancel the crosstalk. This is a crosstalk canceling (referred to as "CTC") method accomplished with the three-beam pickup.

When a groove recordation type optical disc is recorded or played back with the three-beam pickup, it is necessary to focus the auxiliary beams between grooves in order to detect the tracking error signal with the DPP method. On the other hand, in order to implement the CTC method on a groove recordation type optical disc with the three-beam pickup, it is necessary to focus the auxiliary beams onto adjacent grooves. In order to ensure compatibility between the operations of the DPP and CTC methods with the three-beam pickup, therefore it is required to vary the focal points of the auxiliary beams by mechanically rotating the grating or varying the pitch of the diffraction element using a liquid crystal element grating.

However, the mechanical grating rotation cannot be momentarily switched to the diffraction element pitch variation, and vice versa. For example, if the auxiliary beams are used for the DPP method during recording and the three-beam pickup wants to perform a playback operation with the CTC method, the change from the DPP method to the CTC method cannot take place instantly. This is unsuited for a high transfer-rate optical disc system that needs to switch between recording and playback very quickly.

SUMMARY OF THE INVENTION

The present invention is aimed to provide an optical pickup device that can obtain a tracking error signal by the DPP method when various kinds of optical discs having different optical disc structures are recorded or played back, and can use the CTC method whatever optical disc is played back.

According to one aspect of the present invention, there is provided an optical pickup device driven by an error signal comprising: a grating element for receiving a light beam to create zero order diffracted light, ±first order diffracted light and ±second order diffracted light when the light beam passes through the grating element; an optical system for focusing the zero order, ±first order and ±second order diffracted light on a recording surface of an optical recording medium so as to form a spot of the zero order diffracted light on a first track extending on the recording surface, spots of the ±second order diffracted light on tracks adjacent to the first track, and spots of the ±first order diffracted light between the spot of the zero order diffracted light and the spots of the ±second order diffracted light; and an optical detector having first to fifth independent light-receiving elements, the first light-receiving element being adapted to receive returning light from the spot of the zero order diffracted light, the second and third light-receiving elements being adapted to receive returning light from the spots of the ±first order diffracted light, and the fourth and fifth light-receiving elements being adapted to receive returning light from the spots of the ±second order diffracted light, to produce output signals used to create an error signal.

The first light-receiving element may include four independent light-receiving portions which may be adjacent to each other and partitioned by two division lines intersecting each other perpendicularly. One of the division lines may be parallel to a track extending direction.

Each of the second to fifth light-receiving elements may include at least two independent light-receiving portions. The two independent light-receiving portions may be adjacent to each other and partitioned by a division line extending substantially parallel to a track extending direction.

The optical pickup device may further include a first tracking error signal calculation circuit connected with the first light-receiving element for creating a first tracking error signal based on the output signal from the first light-receiving element. The optical pickup device may further include a second tracking error signal calculation circuit connected with the first to third light-receiving elements for creating a second tracking error signal based on the output signals from the first to third light-receiving elements. The optical pickup device may further include a third tracking error signal calculation circuit connected with the first, fourth and fifth light-receiving elements for creating a third tracking error signal based on the output signals from the first, fourth and fifth light-receiving elements.

The optical pickup device may further include determination means for determining a structure of the optical recording medium if the optical recording medium has a predetermined track pitch. The optical pickup device may further include selection means for selecting one of the first, second, and third tracking error signals in accordance with the determined structure of the optical recording medium. The selection means may select the first tracking error signal when the optical recording medium is a read-only medium. The selection means may select the second tracking error signal when the optical recording medium has a groove recording structure. The selection means may select the third tracking error signal when the optical recording medium has a land-groove recording structure.

The optical pickup device may further include a crosstalk cancellation circuit connected with the first, fourth and fifth light-receiving elements for reducing an amount of crosstalk in the output signal from the first light-receiving element and originating from signals from adjacent tracks, based on the output signals from the fourth and fifth light-receiving elements.

The optical pickup device may further include an optical element for astigmatizing at least the returning light from the spot of the zero order diffracted light. The optical element may be a cylindrical lens positioned in an optical path of the returning light of the zero order diffracted light such that a center axis of the cylindrical lens extends at an angle of 45° to a track extending direction on the optical recordation medium.

DETAILED DESCRIPTION OF THE INVENTION

Embodiments of a record/playback device including an optical pickup device in accordance with the present invention will be described.

Optical Pickup Device

Figure 1:
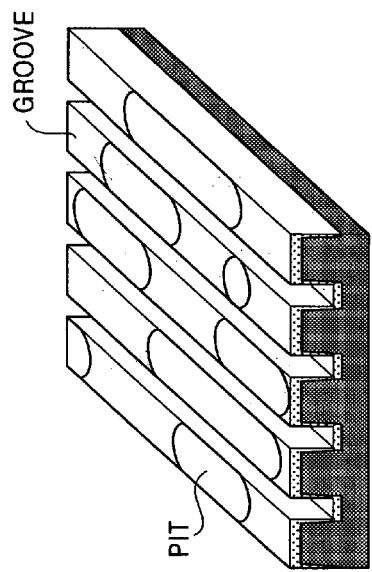
FIG. 1 is an enlarged schematic perspective view showing a structure of a ROM optical disc in accordance with the related art.
Figure 2:
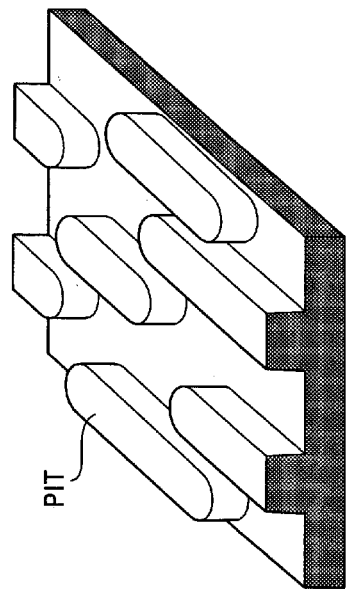
FIG. 2 is an enlarged schematic perspective view showing a structure of a groove recording type optical disc in accordance with the related art.
Figure 3:
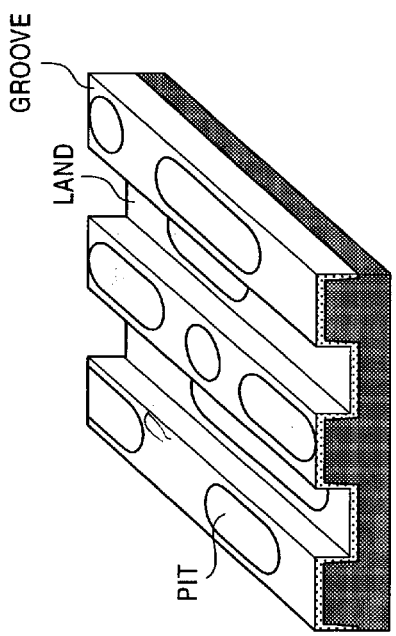
FIG. 3 is an enlarged schematic perspective view showing a structure of a land-groove recording type optical disc in accordance with the related art.
Figure 4:
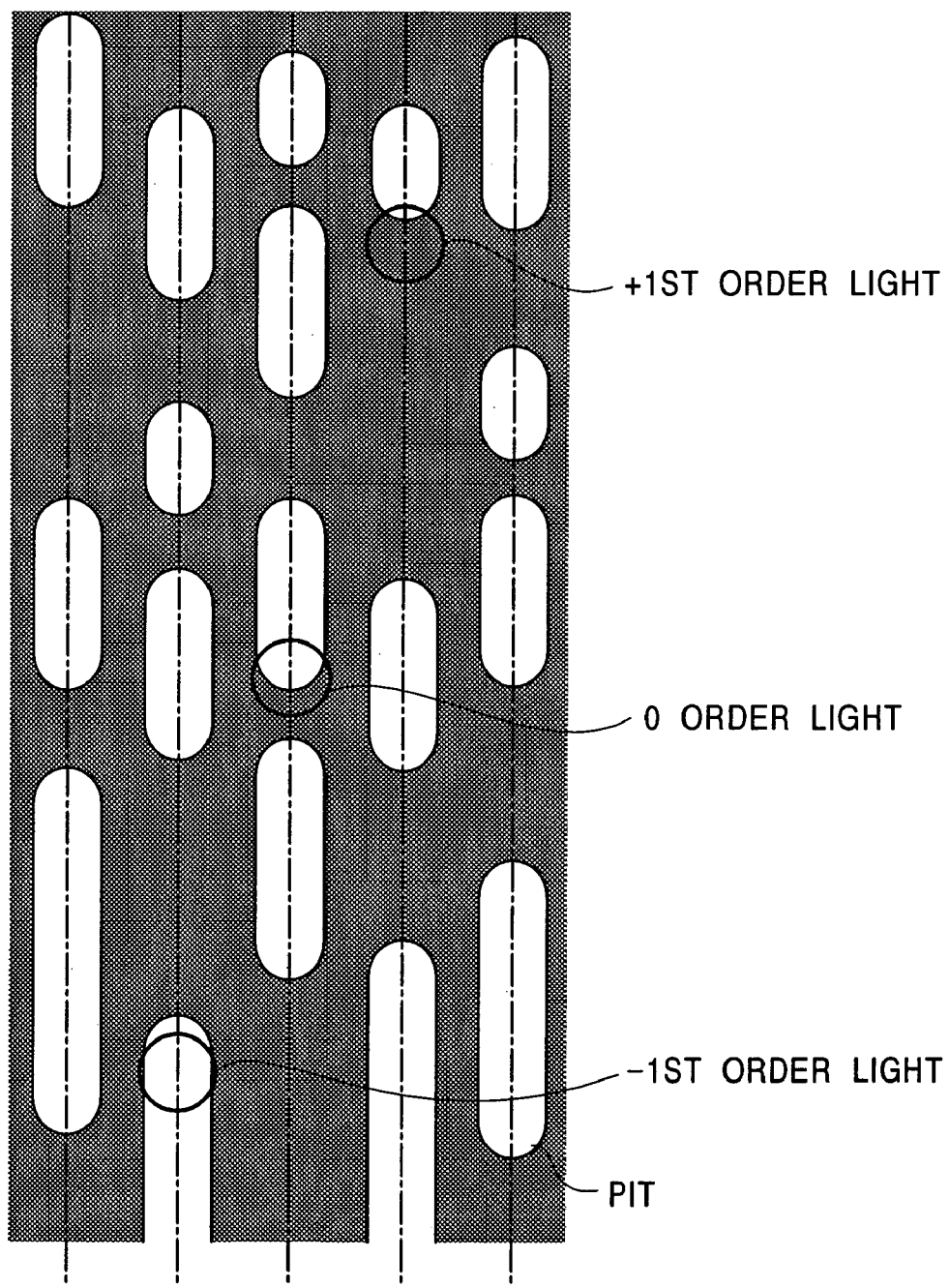
FIG. 4 illustrates an enlarged schematic plan view of an optical disc in accordance with the related art.
Figure 5:
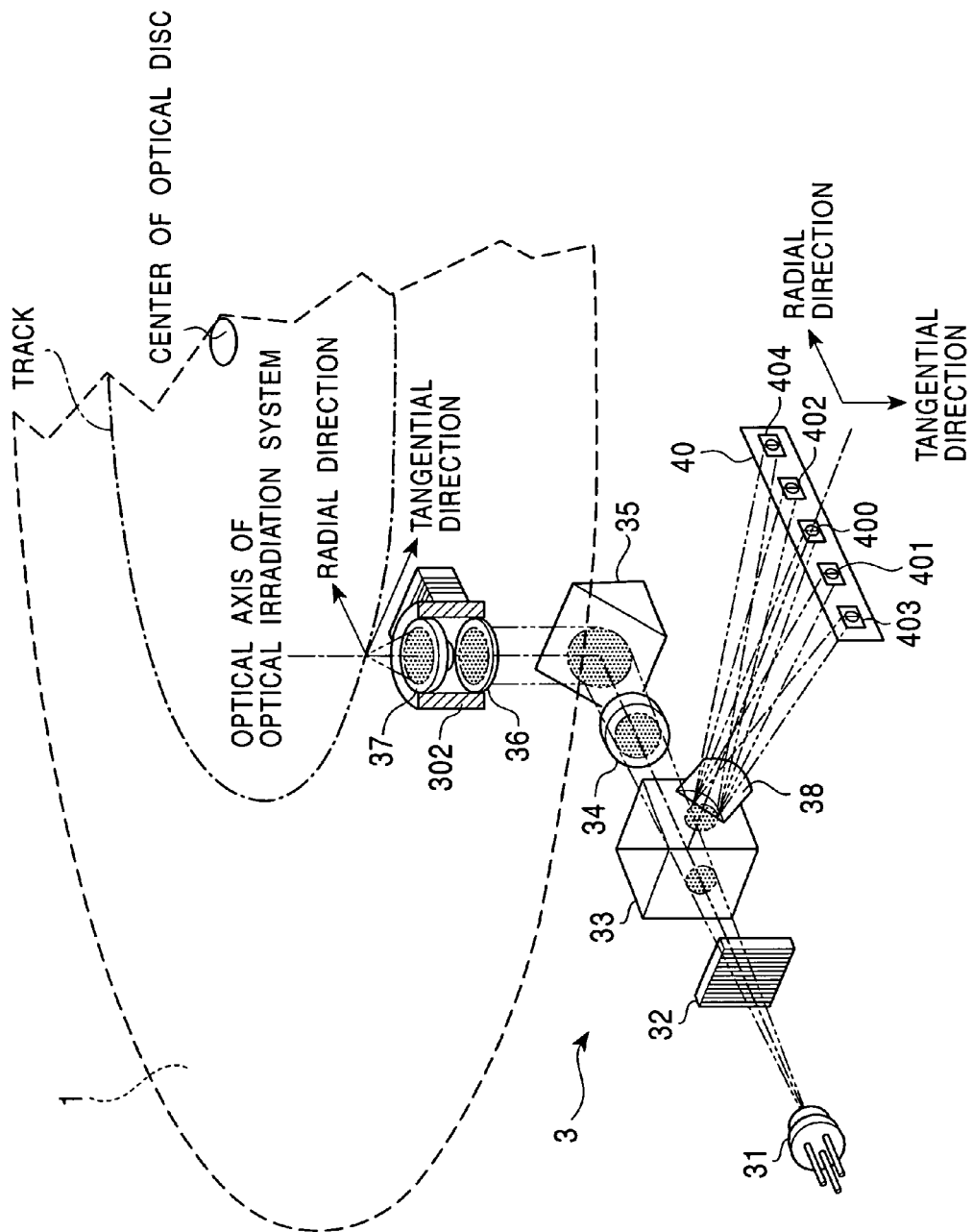
FIG. 5 illustrates a schematic perspective view of an optical pickup device in accordance with one embodiment of the present invention.

FIG. 5 shows the structure of an optical pickup device according to one embodiment of the present invention.

An optical disc 1 has a recording layer on which one or more trains of pits or tracks are formed spirally or coaxially. The optical disc 1 is placed on a turntable of a spindle motor (not shown) such that the optical disc 1 is spaced from an objective lens 37 of an optical pickup device 3. The optical pickup device 3 includes a semiconductor laser 31 that is a light source, a grating 32, a polarization beam splitter 33, a collimator lens 34, a mirror 35, a quarter wavelength plate 36, the objective lens 37, an astigmatism-producing optical element 38, and an optical detector 40. The astigmatism-producing optical element 38 is made up from an optically transparent material such as a cylindrical lens. The optical detector 40 includes a light-receiving element 400 for zero order diffracted light component of a returning light, a light-receiving elements 401 and 402 for ±first order diffracted light components of the returning light, and light-receiving elements 403 and 404 for ±second order diffracted light components of the returning light.

As illustrated in FIG. 5, a light beam emitted from the semiconductor laser 31 passes into the polarization beam splitter 33 through the grating 32. The polarization beam splitter 33 has a polarizing mirror. The incident beam passes through the polarization beam splitter 33 and the collimator lens 34. The optical path of the beam is varied by 90 degrees by the mirror 35. The beam then passes through the quarter wavelength plate 36 and reaches the objective lens 37. The beam is then radiated onto the recording surface of the optical disc 1 from the object lens 37. In this way, the optical irradiation system (or the object lens 37) focuses the light beam onto the pit trains or tracks on the optical disc 1 and forms five optical spots (not shown) on the recording surface.

The five spots of the diffracted light radiated on the recording surface are prepared by the diffraction of the grating 32 positioned between the light source 31 and the objective lens 37. The duty ratio and diffraction efficiency of the grating 32 are so set that zero order diffracted light appears at the center, ±first order diffracted light appear on opposite sides of the zero order diffracted light, and ±second order diffracted light appear on opposite sides of the ±first order diffracted light (see FIG. 9). The zero order diffracted light is a light component not affected by diffraction. In general, if a diffraction grating having a particular grating pattern (i.e., the grating 32), passes the light beam, the grating produces the zero order diffracted light on the optical axis of the light beam and higher orders of diffracted light that are regularly spaced from each other and arranged in line when the diffracted light impinges on a plane. In this embodiment, the diffracted light components up to the ±second order are used. The zero order diffracted light component that is the main beam and the ±first and ±second order diffracted light components that are the four auxiliary beams arranged linearly and symmetrical with respect to the main beam are radiated onto the recording surface of the optical disc 1. The grating 32 may be a flat glass plate having irregularities thereon. Alternatively, the grating may be a liquid crystal panel having a particular transparent electrode pattern.

As shown in FIG. 5, the light reflected from the five optical spots on the recording surface of the optical disc 1 (referred to as "returning light") is introduced to the optical detector 40 by the light detecting optical system. Specifically, the returning light passes again into the polarization beam splitter 33 via the objective lens 37, quarter wavelength plate 36, mirror 35, and collimator lens 34. The optical path of the returning light is varied to a direction different from the direction directed toward the semiconductor laser 31 by the polarization beam splitter 33. The returning light is guided to the optical detector 40 through the astigmatization optical element 38. The returning light is astigmatized when passing through the astigmatization optical element 38. The returning light component of the zero order diffracted light enters the light-receiving element 400. The returning light components of the ±first order diffracted light enter the light-receiving elements 401 and 402. The returning light components of the ±second order diffracted light enter the light-receiving elements 403 and 404. The light-receiving elements 400 to 404 of the optical detector 40 convert the incident light components into electricity respectively.

Figure 6:
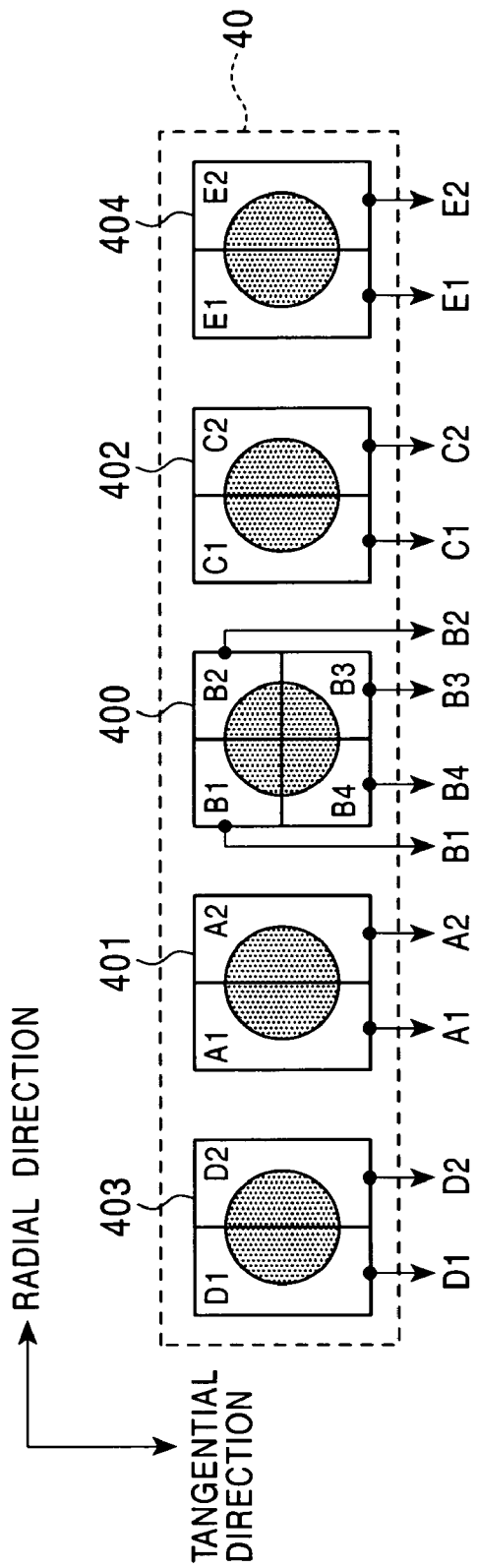
FIG. 6 is a schematic plan view showing the configuration of optical detectors in the optical pickup device shown in FIG. 5.

Referring to FIG. 6, the light-receiving element 400 of the optical detector 40 for the zero order diffracted light includes four independent light-receiving portions B1, B2, B3, and B4 having the same area. The portions B1 to B4 are adjacent to each other and partitioned by two division lines intersecting each other perpendicularly. One of the division lines is parallel to the direction in which the tracks extend (i.e., the tangential direction). Each of the light-receiving elements 401 and 402 for the ±first order diffracted light includes two independent light-receiving portions (A1 and A2, or C1 and C2), which are adjacent to each other and partitioned by one division line extending substantially parallel to the track extending direction. Similarly, each of the light-receiving elements 403 and 404 for the ±second order diffracted light includes two independent light-receiving portions (D1 and D2, or E1 and E2) which are adjacent to each other and partitioned by one division line extending substantially parallel to the track extending direction. The optical detector 40 is so located that if the optical spot is in focus on the recording surface of the optical disc 1, the zero order diffracted light component of the returning light creates a circle of least confusion, which occurs due to the astigmatism, at the intersection of the division lines of the light-receiving element 400 for the zero order diffracted light. It should be noted that the light-receiving elements 400 to 404 for the zero, ±first and ±second order diffracted light components do not need to be arranged linearly. It is only necessary that the light-receiving elements 400 to 404 appropriately capture the five light components of the diffracted light returning from the optical disc 1. The locations of the light-receiving elements 400 to 404 can be independent from each other.

As shown in FIG. 5, the objective lens 37 of the pickup 3 is supported on a tracking actuator 302. The tracking actuator 302 performs a tracking servo operation. Specifically, the tracking actuator 302 moves the objective lens 37 in a radial direction of the optical disc 1 in accordance with a level and polarity of a drive signal supplied from a tracking driver (will be described), thereby causing the light beam to trace a desired track.

The pickup 3 also includes a focus actuator (not shown) operatively coupled to the objective lens 37. The focus actuator performs a focusing servo operation. Specifically, the focus actuator moves the objective lens 37 vertically relative to the surface of the optical disc 1 (in the direction of the optical axis) in accordance with the level and polarity of the drive signal, thereby causing the light beam emitted from the light source to focus onto a desired recording layer.

The astigmatizing method is used in the focus servo. As shown in FIG. 5, the cylindrical lens 38 that is an astigmatizing optical element is so placed in the optical path of the returning light that the center axis of the cylindrical lens 38 (i.e., the axis of rotational symmetry of a cylindrical curved surface (or a lens surface) of the cylindrical lens 38) extends at an angle of 45° relative to the extending direction (longitudinal direction) of the tracks on the optical disc. This configuration astigmatizes the returning light converged by the objective lens 37. Consequently, a line image is formed at a smaller depth (or at a proximal position), a circle of least confusion is formed at an intermediate depth (or at an intermediate position), and a line image is formed at a greater depth (or at a distal position) in accordance with the distance between the recording surface of the optical disc 1 and the objective lens 37. Hence, when the light beam is in focus, the detection optical system projects the circle of least confusion derived from the light returning from the spot of the zero order diffraction onto the light-receiving element 400. When the light beam is defocused, the detection optical system projects a line image extending in a diagonal direction of the light receiving surface and an elliptical spot of the zero order light onto the light-receiving element 400. Therefore, a focus error signal in the astigmatizing method can be obtained by taking the difference between the sum signal from one pair of light-receiving portions B1 and B3 at diagonal positions of the light-receiving element 400 light and the sum signal from the other pair of light-receiving elements B2 and B4.

Figure 7:
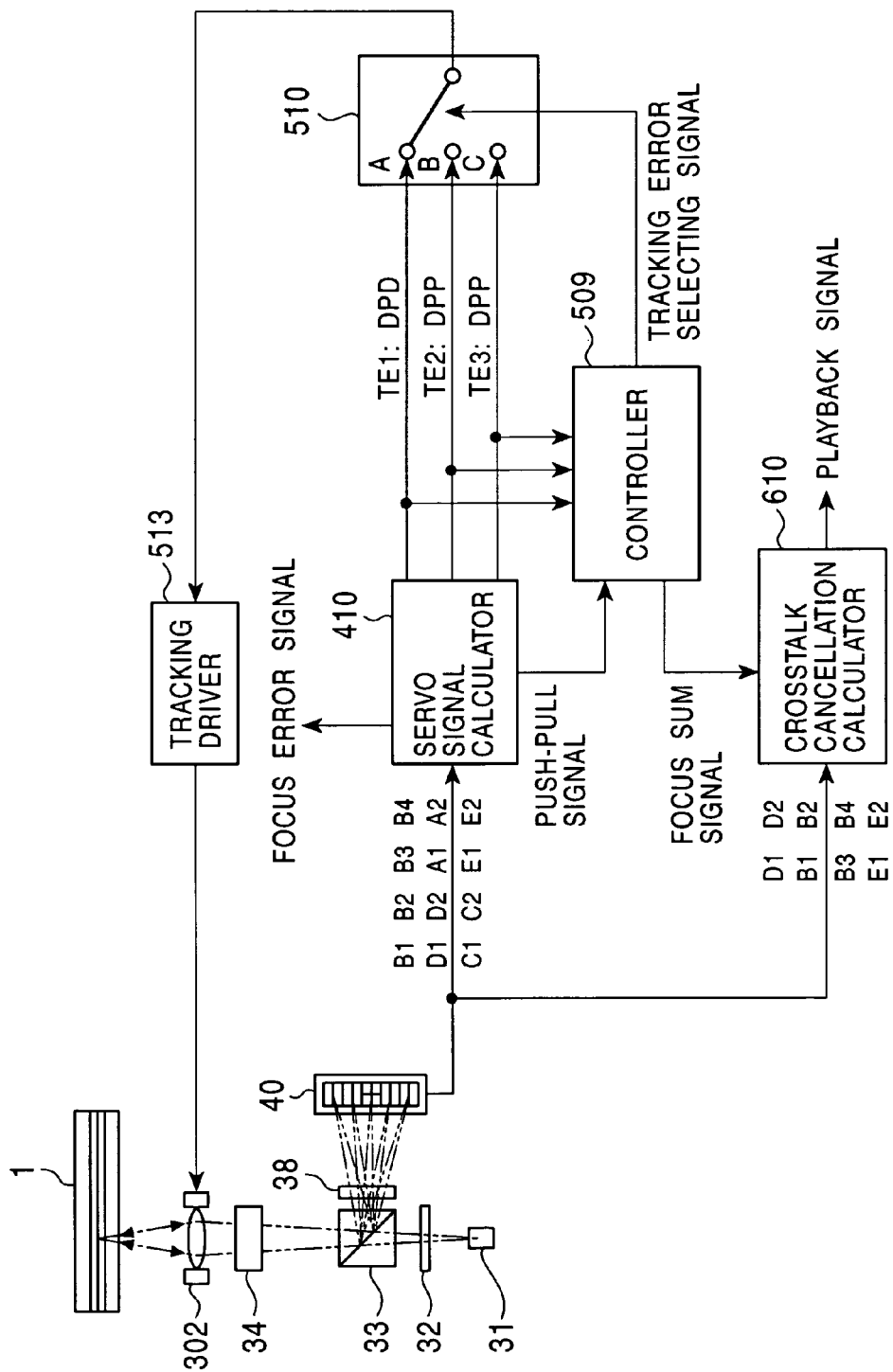
FIG. 7 is a schematic block diagram of the optical pickup device shown in FIG. 5.

Referring now to FIG. 7, the optical detector 40 is connected with a servo signal calculator 410. The servo signal calculator 410 creates various signals (described later) and supplies them to a controller 509 and a switching circuit 510. First, second and third tracking error signals TE1, TE2, and TE3 are supplied from the servo signal calculator 410 to the switching circuit 510. The switching circuit 510 is connected with a tracking driver 513 and controlled by a signal from the controller 509. This controller 509 is a microcomputer that includes a processor, a ROM, and a RAM. The tracking error signal selected and relayed by the switching circuit 510 is supplied to the tracking driver 513. The tracking driver 513 produces a drive signal on the basis of the output from the switching circuit 510, and supplies the drive signal to the tracking actuator 302. Thus, when a tracking servo loop is closed (i.e., when the switching circuit 510 selects one input and relays the output signal of the servo signal calculator 410 to the tracking driver 513), the tracking actuator 302 is so driven that the level of the selected tracking error signal becomes null, i.e., the beam spot follows the track.

The optical detector 40 is also connected with a crosstalk cancellation calculator 610 that implements the known CTC method. The crosstalk cancellation calculator 610 is controlled by the controller 509 and produces an RF (radio-frequency) signal of a playback signal. The playback signal is sent to a read signal processing system (not shown) via an RF amplifier (not shown) and via an equalizer (not shown).

Servo Signal Calculator

Figure 8:
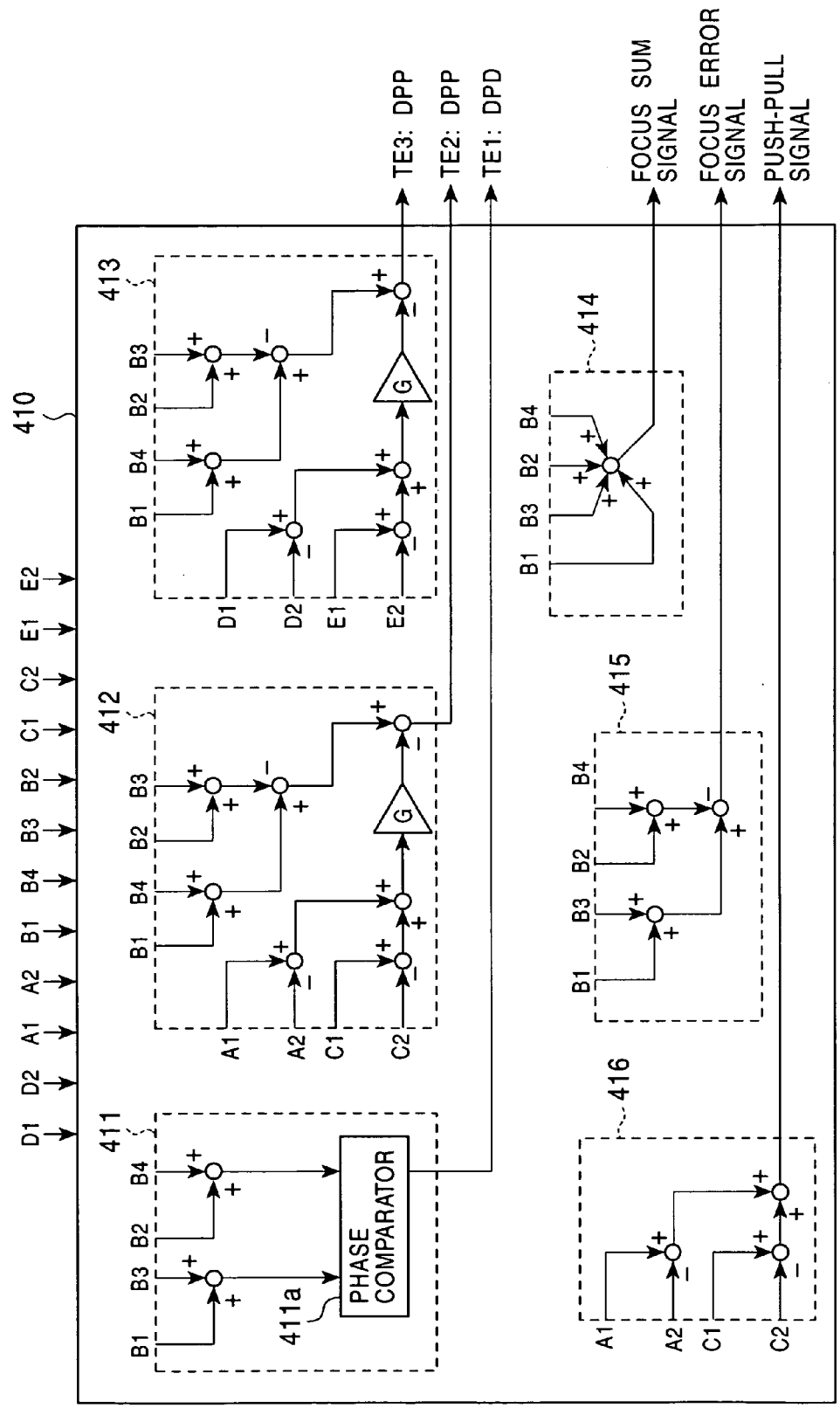
FIG. 8 is a schematic block diagram of a servo signal calculator in the optical pickup device shown in FIG. 5.

As shown in FIG. 8, the servo signal calculator 410 connected with the optical detector 40 includes a first tracking error signal calculation circuit 411 for the zero order diffracted light, a second tracking error signal calculation circuit 412 for the ±first order diffracted light, and a third tracking error signal calculation circuit 413 for the ±second order diffracted light. The tracking error signal calculation circuits 411, 412 and 413 perform predetermined calculations based on electrical signals produced by the photoelectric conversion, and create a plurality of tracking error signals.

The tracking error signal calculation circuit 411 for the zero order diffracted light operates based on a differential phase detection (referred to as "DPD") method. The DPD method detects a tracking error signal from phase variations of diffraction pattern derived from a pit train (concavo-convex representing the recorded signal) extending along one track.

In the tracking error signal calculation circuit 411 for the zero order diffracted light, a phase comparator 411a compares the sum signal from one pair of light-receiving portions B1 and B3 at the diagonal positions of the four-segmented light-receiving element 400 and the sum signal from the other pair of light-receiving elements B2 and B4 in terms of their phase, so as to calculate the phase difference between them, thus creating the first tracking error signal TE1. In this way, the tracking error signal calculation circuit 411 connected with the zero order diffracted light-receiving element 400 creates and outputs the first tracking error signal TE1 based on the DPD method.

The tracking error signal calculation circuit 412 connected with the light-receiving elements 400, 401 and 402 operates based on the DPP method. The DPP method detects a tracking error signal from reflectance variations of the light spots (i.e., variations in intensity) caused by the trains of pits and recorded marks arranged along a certain track and adjacent tracks.

In the DPP method, if two auxiliary beams and an intervening, central main beam are converged and focused onto the recording surface, and the spot of the main beam passes along the center of the track, then the intensity distribution of the reflected light is symmetric horizontally. No difference is created between the detection signals (B1+B4) and (B2+B3) supplied from the light-receiving element 400. On the other hand, if the spot of the main beam passes over the pits off the center of the track, the intensity distribution of the reflected light becomes asymmetric. This creates a difference between the detection signals from the light-receiving element 400. It should be noted that the push-pull method creates a problem that a tracking error signal suffers from offset due to shift of the objective lens 37 in a radial direction of the optical disc 1. In order to cope with the problem, therefore, the distance between the spots created by the two auxiliary beams on the opposite sides of the main beam is set to be equal to the interval between the tracks. The difference between the intensities of the reflected light from the spots created by the two auxiliary beams is found from the detection signals obtained from the light-receiving portions of the light-receiving elements 401 and 402 and corrected. In this way, the offset signal corresponding to the radial shift of the objective lens is canceled out.

Accordingly, if the symbols given to the light-receiving portions of the light-receiving elements 400, 401 and 402 indicate their respective outputs, the tracking error signal TE2 produced by the tracking error signal calculation circuit 412 is given by the following equation (1):

$$TE2 = \{(B1+B4)-(B2+B3)\} - G \times \{(A1-A2)+(C1-C2)\} \quad (1)$$

where G is a correction coefficient.

The tracking error signal calculation circuit 413 connected with the light-receiving elements 400, 403 and 404 also operates based on the DPP method. If the symbols given to the light-receiving portions of the light-receiving elements 400, 403 and 404 indicate their respective outputs, the tracking error signal TE3 obtained from the tracking error signal calculation circuit 413 is given by the following equation (2):

$$TE3 = \{(B1+B4)-(B2+B3)\} - G \times \{(D1-D2)+(E1-E2)\} \quad (2)$$

where G is a correction coefficient.

As illustrated in FIG. 8, the servo signal calculator 410 further includes a SUM signal calculation circuit 414 connected with the zero order diffracted light-receiving element 400, and creates the total sum (B1+B3+B2+B4) of the photoelectrically converted signals from all the light-receiving portions of the light-receiving element 400 as a focus SUM signal. The focus SUM signal is supplied to the controller 509. The servo signal calculator 410 also includes a focus error signal calculation circuit 415 connected with the zero order diffracted light-receiving element 400. If the symbols given to the light-receiving portions of the light-receiving element 400 indicate their respective outputs, a focus error signal FE obtained by the astigmatization method is derived according to the equation (3).

$$FE = (B1+B3)-(B2+B4) \quad (3)$$

The servo signal calculator 410 further includes a radial push-pull signal calculation circuit 416 connected with the light-receiving elements 401 and 402. The radial push-pull signal calculation circuit 416 detects radial push-pull signals from the light-receiving elements 401 and 402, and creates a push-pull signal from a differential signal between the radial push-pull signals.

As shown in FIG. 7, the servo signal calculator 410 supplies the first tracking error signal TE1 whose waveform has been equalized by an equalizer (not shown) to one input terminal A of the switching circuit 510. The servo signal calculator 410 also supplies the second and third tracking error signals TE2 and TE3 to input terminals B and C of the switching circuit 510, respectively.

The switching circuit 510 is supplied with a control signal from the controller 509, and is so controlled that a signal is output from a selected one of the terminals A–C in accordance with the control signal representing the type of the optical disc. Thus, the switching circuit 510 selects one of the tracking error signals and relays it to the tracking driver 513. When the tracking servo loop is closed, the tracking driver 513 drives the tracking actuator 302 such that the light beam follows the track on the recording surface.

The type of the optical disc can be determined, for example, by sensing a particular mark formed on a cartridge receiving the optical disc. Alternatively, focus servo may be applied to the optical disc, and the type of the optical disc may be determined based on the information recorded on the disc.

If no information is stored on the optical disc or no mark is attached to the disc cartridge, then the type of the optical disc can be determined using variations in reflectance of the optical disc known from the focus SUM signal and/or the level of the push-pull signal in the following manner.

For example, the controller 509 determines based on a given threshold level that the disc is a ROM optical disc if the reflectance of the optical disc is large and the level of the push-pull signal is low. If the reflectance is small and the level of the push-pull signal is low, the controller 509 determines that the disc is a groove recordation type optical disc. If the reflectance is small and the level of the push-pull signal is high, the controller 509 determines that the disc is a land-groove recordation type optical disc.

The controller 509 causes the switching circuit 510 to select a tracking error signal on the basis of to the determination made as to the type of the optical disc. Specifically, in the case of a ROM optical disc, the first tracking error signal TE1 is selected. In the case of a groove recordation type optical disc, the second tracking error signal TE2 is selected. In the case of a land-groove recordation type optical disc, the third tracking error signal TE3 is selected. If the optical disc is played back, calculations of the CTC method are performed regardless of the type of the optical disc.

Examples of Operation of Optical Pickup Device

The relationship between the light-receiving elements 400 to 404 of the optical detector 40 and the returning light from the optical spots formed by the zero, ±first and ±second order diffracted light radiated onto the optical disc 1 will be described.

Figure 9:
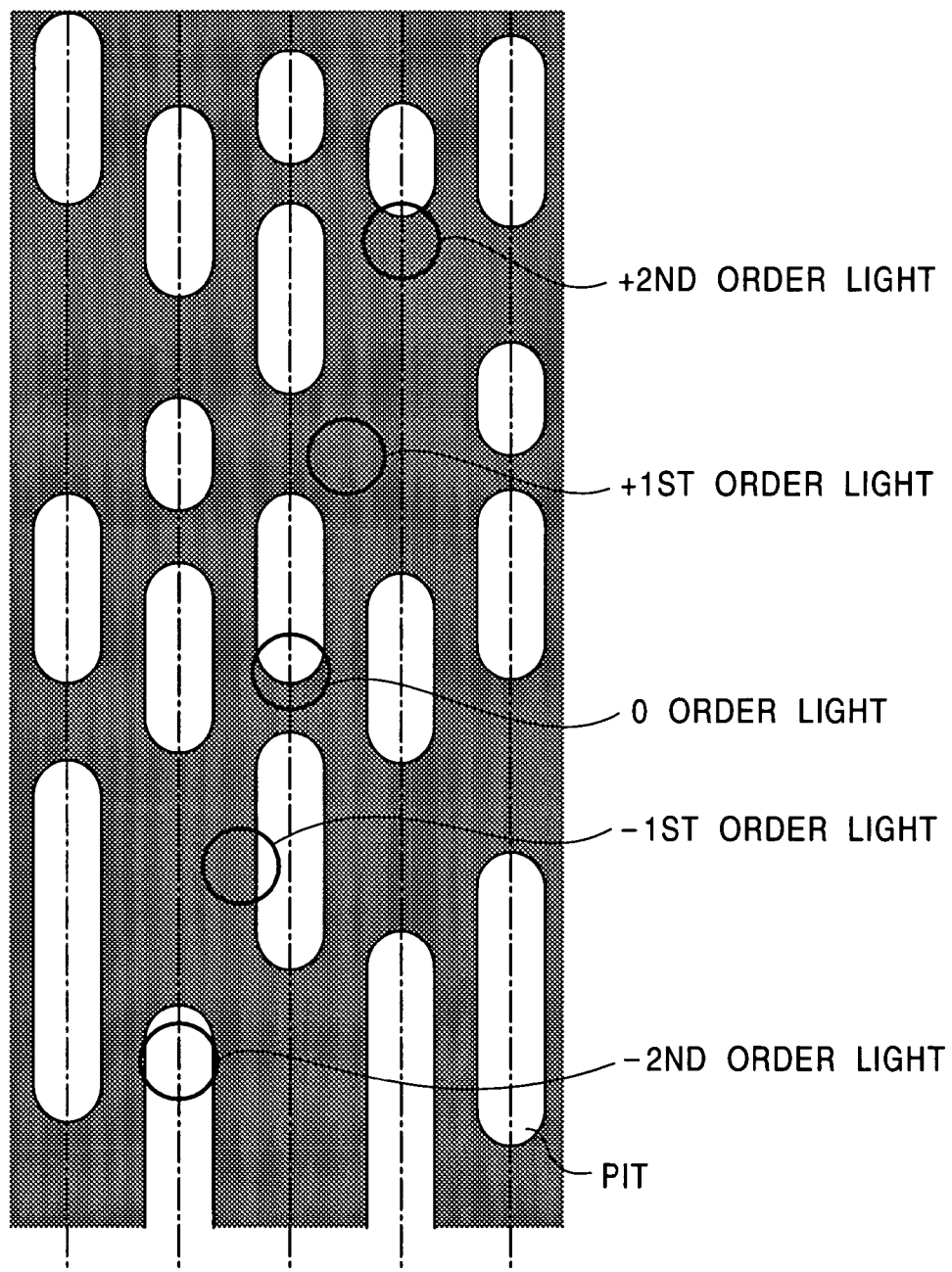
FIG. 9 is a plan view of a ROM optical disc.

First, the case in which a ROM optical disc is played back will be described. FIG. 9 shows the arrangements of the spots on the ROM optical disc surface in accordance with the present invention. The zero order diffracted light is focused onto a track on which signal is recorded. The ±second order diffracted light is focused onto adjacent tracks. The ±first order diffracted light is focused between tracks.

Figure 10:
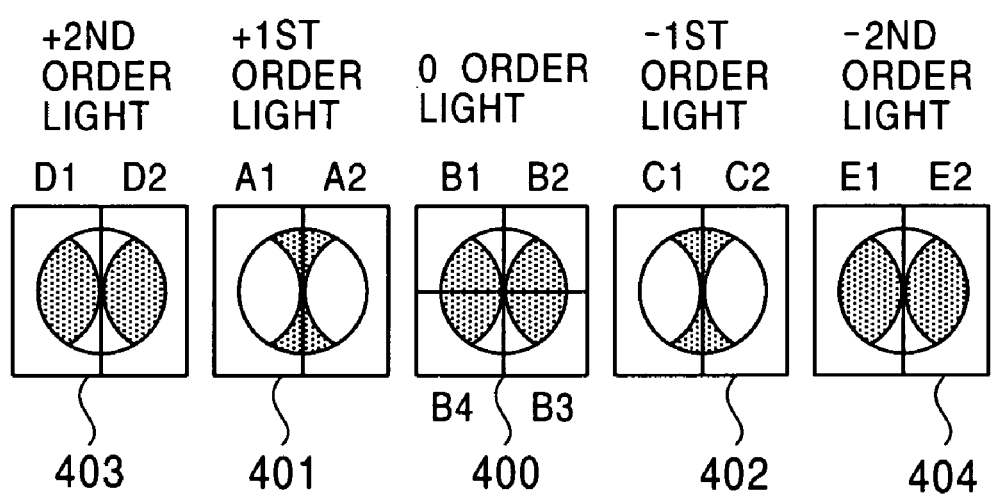
FIG. 10 is a plan view of the optical detector that receives light returning from the optical disc shown in FIG. 9.

When the ROM optical disc is played back, the light-receiving element 400 for the zero order diffracted light, the light-receiving elements 401 and 402 for the ±first order diffracted light, and the light-receiving elements 403 and 404 for the ±second order diffracted light receive all the five beam components of the returning light from the optical disc surface as shown in FIG. 10. The first tracking error signal TE1 is obtained, using the main beam or the zero order diffracted light with the DPD method, by the tracking error signal calculation circuit 411 connected with the light-receiving element 400.

The ±second order diffracted light focused onto the two tracks adjacent to the track onto which the zero order diffracted light is radiated is received by the light-receiving elements 403 and 404 and used for the CTC method. Accordingly, when the ROM optical disc is played back, the CTC method can be implemented using the signals from the light-receiving elements 400, 403 and 404.

Figure 11:
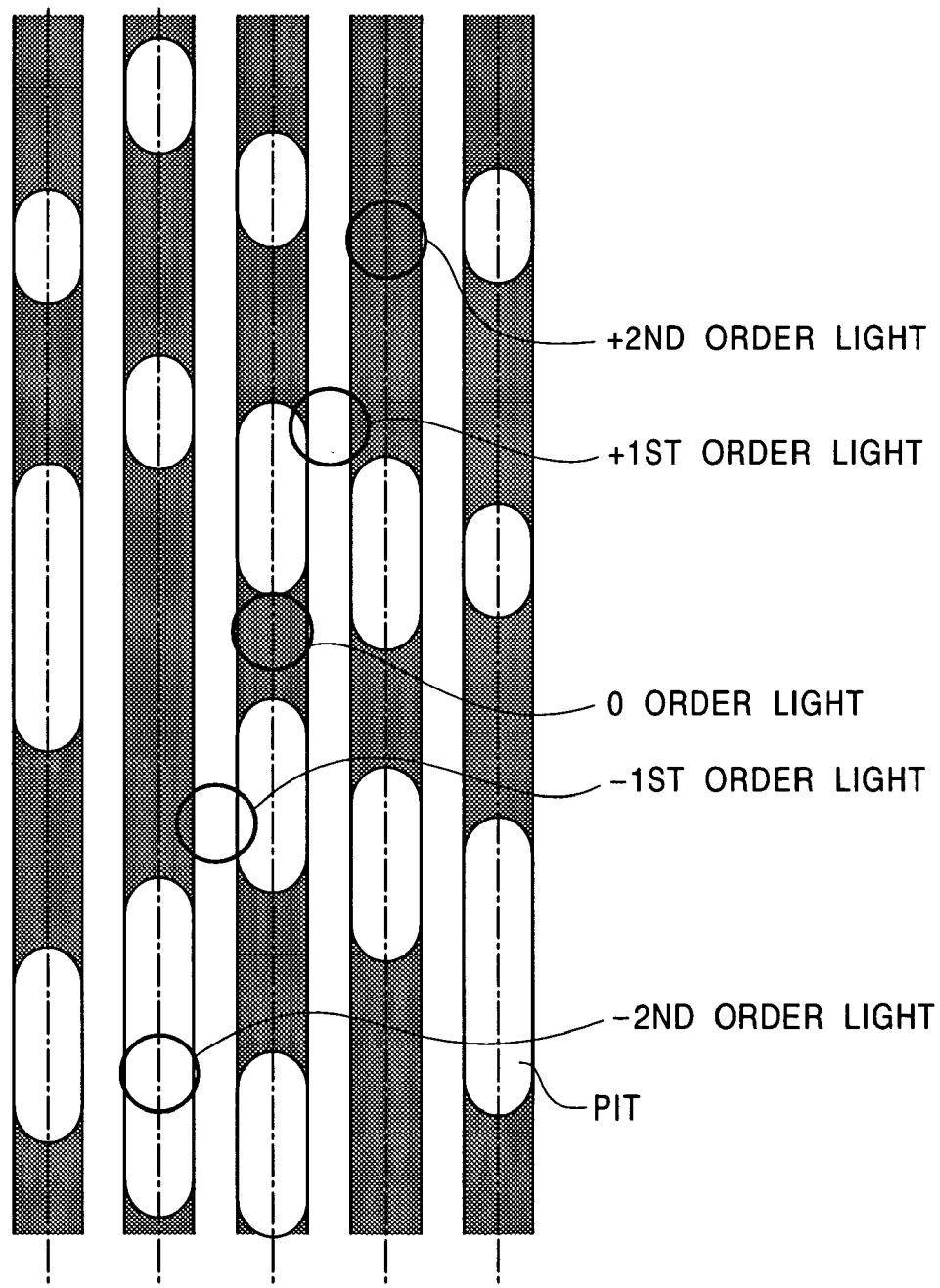
FIG. 11 is a plan view of a groove recording optical disc.

The case in which a groove recordation type optical disc is recorded and played back will be described next. FIG. 11 shows the arrangement of spots on a groove recordation type optical disc in accordance with the present invention. The zero order diffracted light is focused onto the track on which signal is recorded. The ±second order diffracted light is focused onto the adjacent tracks in the same way as in the case of a ROM optical disc. On the other hand, the ±first order diffracted light is focused onto the grooves.

Figure 12:
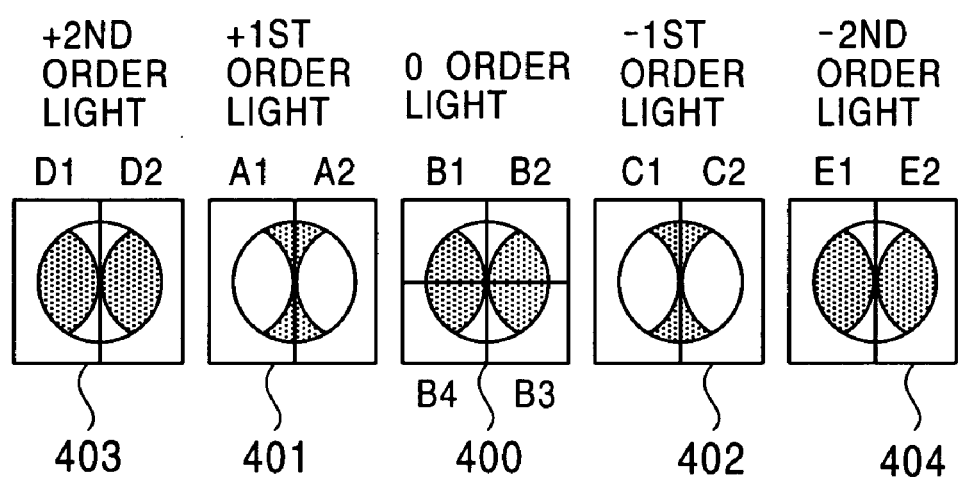
FIG. 12 is a plan view of the optical detector that receives light returning from the optical disc shown in FIG. 11.

When the groove recordation type optical disc is played back, the light-receiving element 400 for the zero order diffracted light, the light-receiving elements 401, 402 for the ±first order diffracted light, and the light-receiving elements 403, 404 for the ±second order diffracted light receive all the five beam components of the returning light from the optical disc surface as shown in FIG. 12. Since a push-pull signal is obtained from the light-receiving elements 401 and 402, a tracking error signal can be obtained for the DPP method by taking the difference between this push-pull signal and another push-pull signal derived from the main beam obtained from the light-receiving element 400. The tracking error signal is unaffected by offset due to shift of the objective lens. During playback, the CTC method is implemented using the light-receiving elements 403 and 404. It should be noted that during playback a tracking error signal for the DPP method may be obtained using the light-receiving elements 400, 401 and 402.

Figure 13:
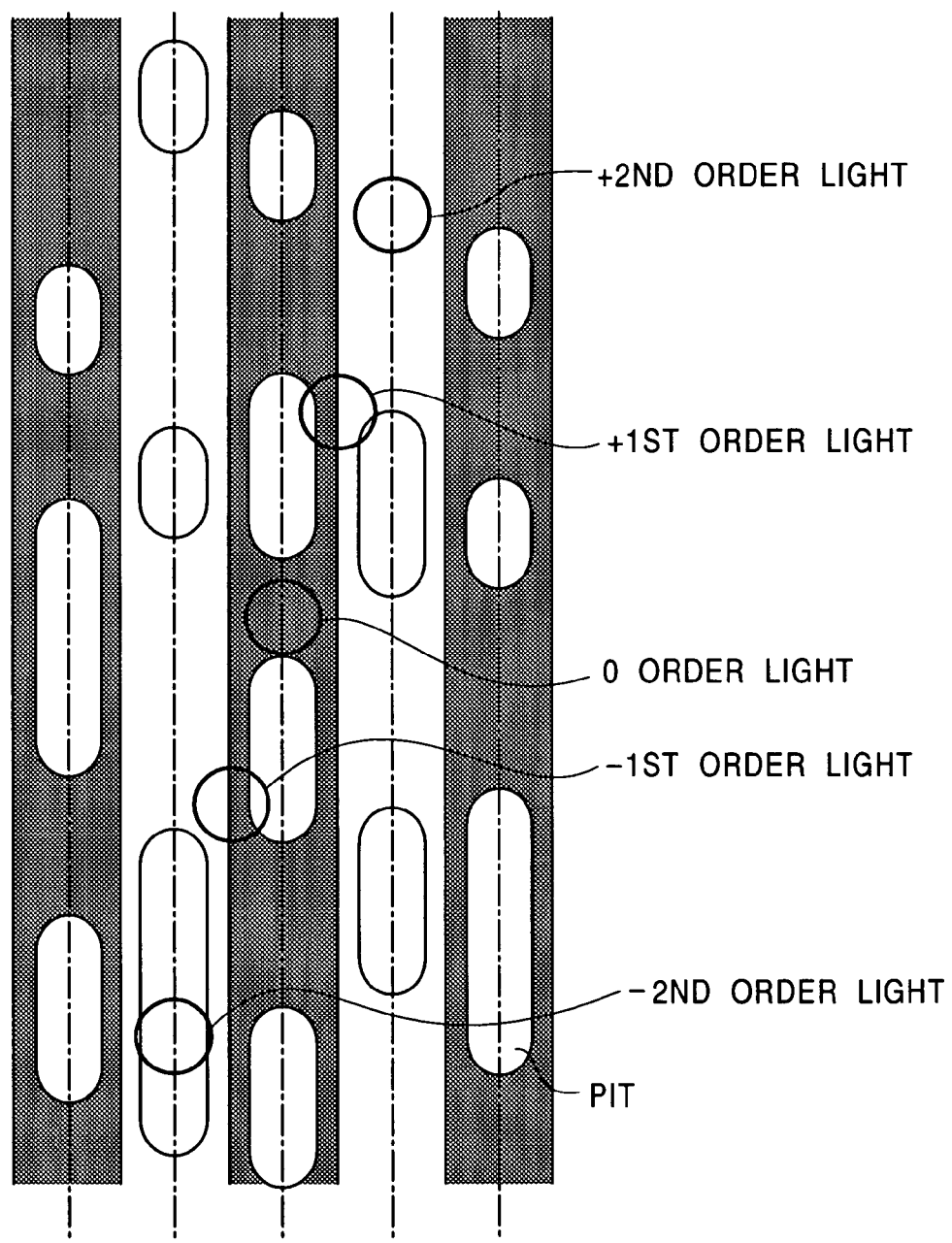
FIG. 13 is a plan view of a land-groove recordation type optical disc.

The case in which a land-groove recordation type optical disc is recorded and played back will be next described. Referring to FIG. 13, illustrated is the arrangement of spots on a land-groove recordation type optical disc in accordance with the present invention. The zero order diffracted light is focused onto the track on which signal is recorded. The ±second order diffracted light is focused on the adjacent tracks, in the same way as in the cases of ROM optical disc and groove recordation type optical disc.

Figure 14:
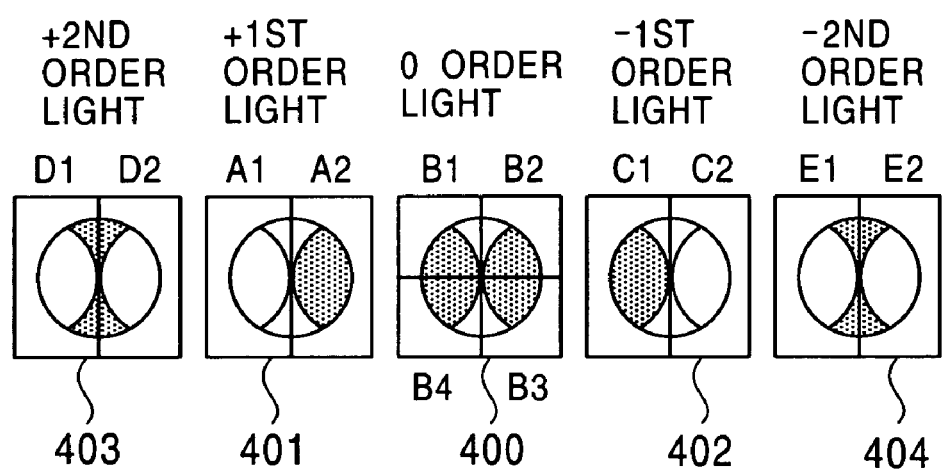
FIG. 14 is a plan view of the optical detector that receives light returning from the optical disc shown in FIG. 13.

When a land-groove recordation type optical disc is played back, the light-receiving element 400 for the zero order diffracted light, the light-receiving elements 401 and 402 for the ±first order diffracted light, and the light-receiving elements 403 and 404 for the ±second order diffracted light receive all the five beam components of the returning light from the optical disc surface as shown in FIG. 14. Since the light-receiving elements 403 and 404 can obtain a push-pull signal, as the light-receiving elements 401 and 402 can, it is possible to obtain a tracking error signal for the DPP method by taking the difference between this push-pull signal and another push-pull signal derived from the main beam obtained by the light-receiving element 400. The tracking error signal is unaffected by offset due to shift of the objective lens. Since the disc structure of the land-groove recordation type optical disc is different from that of the groove recordation type optical disc, the optical detector for obtaining a tracking error signal for the DPP method in this instance differs from that used in the case of the groove recordation type optical disc. During playback, the CTC method is implemented using the signals from the light-receiving elements 400, 403 and 404 in the same way as in the cases of ROM and groove recordation type discs.

In any optical disc structure, the beam used in the CTC method during playback is ±second order diffracted light. The auxiliary beam detectors used in the CTC method are the light-receiving elements 403 and 404 irrespective of the optical disc structure. It is therefore unnecessary to install many optical detectors that are difficult to manufacture.

As described above, the ROM optical disc, groove recordation type optical disc, and land-groove recordation type optical disc are different in structure but are substantially identical in the pitch between adjacent tracks on which information is stored. That is, the arrangement of the auxiliary beams used for the CTC method is substantially identical regardless of the optical disc structure. If this holds true in the next generation optical disc, the above described embodiment can also be utilized.

When three kinds of optical discs having different optical disc structures are recorded and played back with a pickup device of the present invention, a tracking error signal for the DPP method can be obtained whatever optical disc is recorded, and the CTC method can be used whatever optical disc is played back. Consequently, the present invention can offer a pickup device having excellent playability.

This application is based on a Japanese patent application number 2001-14428, and the entire disclosure thereof is incorporated herein by reference.

What is claimed is:

1. An optical pickup device driven by an error signal comprising:
    a grating element for receiving a light beam to create zero order diffracted light, ±first order diffracted light and ±second order diffracted light when the light beam passes through the grating element;
    an optical system for focusing the zero order, ±first order and ±second order diffracted light on a recording surface of an optical recording medium so as to form a spot of the zero order diffracted light on a first track extending on the recording surface, spots of the ±second order diffracted light on tracks adjacent to the first track, and spots of the ±first order diffracted light between the spot of the zero order diffracted light and the spots of the ±second order diffracted light; and
    an optical detector having first to fifth independent light-receiving elements, the first light-receiving element being adapted to receive returning light from the spot of the zero order diffracted light, the second and third light-receiving elements being adapted to receive returning light from the spots of the ±first order diffracted light, and the fourth and fifth light-receiving elements being adapted to receive returning light from the spots of the ±second order diffracted light, to produce output signals used to create an error signal.

2. The optical pickup device of claim 1, wherein the first light-receiving element includes four independent light-receiving portions adjacent to each other and partitioned by two division lines intersecting each other perpendicularly, one of the division lines being parallel to a track extending direction.

3. The optical pickup device of claim 1, wherein each of the second to fifth light-receiving elements includes at least two independent light-receiving portions adjacent to each other and partitioned by a division line extending substantially parallel to a track extending direction.

4. The optical pickup device of claim 1 further including:
    a first tracking error signal calculation circuit connected with the first light-receiving element for creating a first tracking error signal based on the output signal from the first light-receiving element;
    a second tracking error signal calculation circuit connected with the first to third light-receiving elements for creating a second tracking error signal based on the output signals from the first to third light-receiving elements; and
    a third tracking error signal calculation circuit connected with the first, fourth and fifth light-receiving elements for creating a third tracking error signal based on the output signals from the first, fourth and fifth light-receiving elements.

5. The optical pickup device of claim 4 further including:
    determination means for determining a structure of the optical recording medium including a predetermined track pitch; and
    selection means for selecting one of the first, second, and third tracking error signals in accordance with the determined structure of the optical recording medium.

6. The optical pickup device of claim 5, wherein the selection means selects the first tracking error signal when the optical recording medium is a read-only medium.

7. The optical pickup device of claim 5, wherein the selection means selects the second tracking error signal when the optical recording medium has a groove recording structure.

8. The optical pickup device of claim 5, wherein the selection means selects the third tracking error signal when the optical recording medium has a land-groove recording structure.

9. The optical pickup device of claim 1 further including a crosstalk cancellation circuit connected with the first, fourth and fifth light-receiving elements for reducing an amount of crosstalk in the output signal from the first light-receiving element and originating from signals from adjacent tracks, based on the output signals from the fourth and fifth light-receiving elements.

10. The optical pickup device of claim 1 further including an optical element for astigmatizing at least the returning light from the spot of the zero order diffracted light.

11. The optical pickup device of claim 10, wherein the optical element is a cylindrical lens positioned in an optical path of the returning light of the zero order diffracted light such that a center axis of the cylindrical lens extends at an angle of 45° to a track extending direction on the optical recording medium.

12. An apparatus comprising:
    means for receiving a light beam from a light source to create zero order diffracted light, ±first order diffracted light and ±second order diffracted light;
    means for focusing the zero order ±first order and ±second order diffracted light on a recording surface of an optical recording medium so as to form a spot of the zero order diffracted light on a first track extending on the recording surface, spots of the ±second order diffracted light on tracks adjacent to the first track, and spots of the ±first order diffracted light between the spot of the zero order diffracted light and the spots of the ±second order diffracted light; and
    means having first to fifth light-receiving means, the first light-receiving means being adapted to receive returning light from the spot of the zero order diffracted light, the second and third light-receiving means being adapted to receive returning light from the spots of the ±first order diffracted light, and the fourth and fifth light-receiving means being adapted to receive returning light from the spots of the ±second order diffracted light, to create output signals used to prepare an error signal to drive the apparatus.

13. The apparatus of claim 12, wherein the first light-receiving means includes four independent light-receiving portions adjacent to each other and partitioned by two division lines intersecting each other perpendicularly, one of the division lines being parallel to a track extending direction.

14. The apparatus of claim 12, wherein each of the second to fifth light-receiving means includes at least two independent light-receiving portions adjacent to each other and partitioned by a division line extending substantially parallel to a track extending direction.

15. The apparatus of claim 12 further including:
    means for creating a first tracking error signal based on the output signal from the first light-receiving means;
    means for creating a second tracking error signal based on the output signals from the first to third light-receiving means; and means for creating a third tracking error signal based on the output signals from the first, fourth and fifth light-receiving means.

16. The apparatus of claim 15 further including:
determination means for determining a structure of the optical recording medium; and
selection means for selecting one of the first, second, and third tracking error signals in accordance with the determined structure of the optical recording medium.

17. The apparatus of claim 16, wherein the selection means selects the first tracking error signal if the optical recording medium is a read-only medium, selects the second tracking error signal if the optical recording medium has a groove recording structure, and selects the third tracking error signal if the optical recording medium has a land-groove recording structure.

18. The apparatus of claim 12 further including means for reducing an amount of crosstalk in the output signal from the first light-receiving means and originating from signals from adjacent tracks, based on the output signals from the fourth and fifth light-receiving means.

19. The apparatus of claim 12 further including astigmatic means for astigmatizing at least the returning light from the spot of the zero order diffracted light.

20. The apparatus of claim 19, wherein the astigmatic means is a cylindrical lens positioned in an optical path of the returning light of the zero order diffracted light such that a center axis of the cylindrical lens extends at an angle of 45° to a track extending direction.

* * * * *